Figure 1:
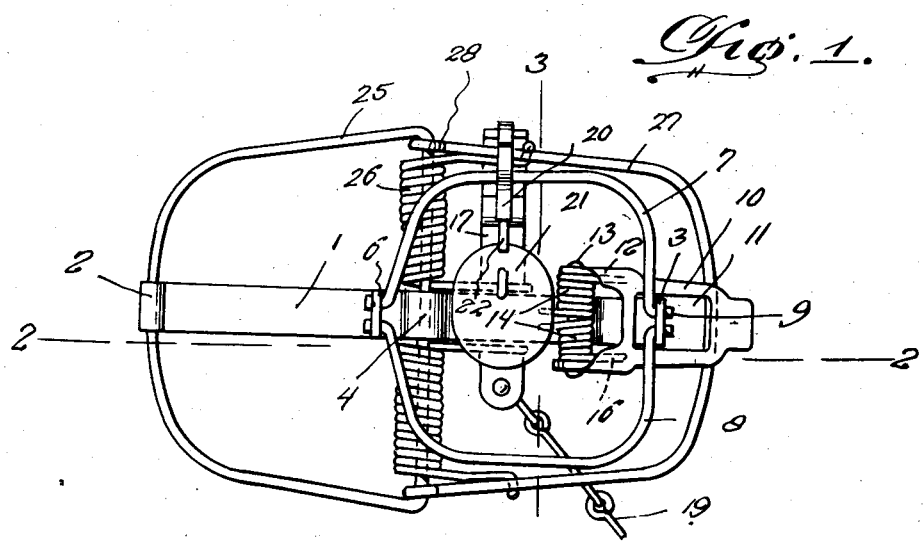

Jan. 18, 1927.  L. G. GOODKNECHT  1,614,788
ANIMAL TRAP
Filed July 14, 1925

Inventor
L. G. Goodknecht,
By Clarence A. O'Brien
Attorney

Patented Jan. 18, 1927.

UNITED STATES PATENT OFFICE.

LOUIS G. GOODKNECHT, OF KANKAKEE, ILLINOIS.

ANIMAL TRAP.

Application filed July 14, 1925. Serial No. 43,563.

The present invention appertains to certain improvements in multiple jawed traps and has for its object the provision of an auxiliary jaw adapted to be released at the same time as the jaws of the main or primary trap, and in its movement to strike the animal caught by the main trap and pushing it to one side but not free from the main trap, pressing it down against the stationary jaw of the auxiliary trap.

I appreciate that this broad object has been accomplished in the prior art, and it is therefore, the primary object of the present invention to generally improve upon such structures and particularly to provide an auxiliary jaw of the class mentioned which has an independent spring for its operation, and which aids the closing means associated with the main jaws so that said main jaws close more quickly and close completely before the auxiliary jaw strikes the animal caught by the main jaws.

A still further very important object of the invention is to generally improve upon traps of this nature by providing an exceedingly simple construction, one which is thoroughly efficient and reliable in operation, strong, durable, comparatively inexpensive to manufacture, and otherwise well adapted to the purpose for which it is designed.

With the above and numerous other objects as will appear as the description proceeds, the invention resides in certain novel features of construction, and in the combination and arrangement of parts as will be hereinafter more fully described and claimed.

In the drawing:—

Figure 2:
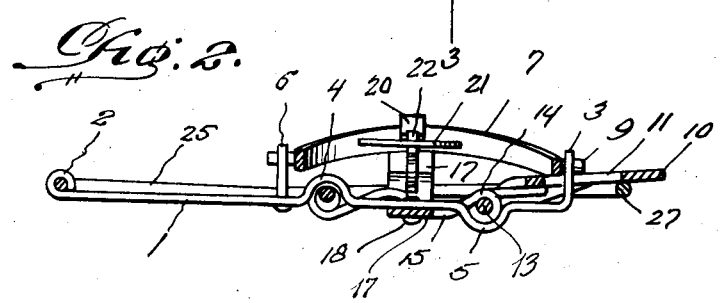
Figure 3:
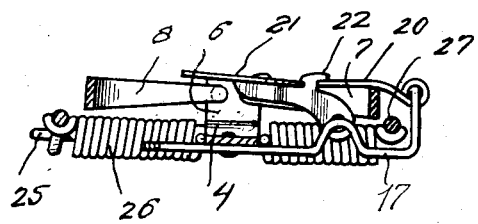

Figure 1 is a top plan view of my improved trap showing the same in a set or open position, Figure 2 is a longitudinal section taken therethrough substantially on the line 2—2 of Figure 1, and Figure 3 is a transverse section taken substantially on the line 3—3 of Figure 1.

Referring to the drawing in detail it will be seen that 1 designates a base bar which is looped at one end as is indicated at 2, and has an upstanding extension at the other end as at 3. At spaced intervals, the intermediate portion of the base bar is provided with curved portions, one being indicated at 4 and disposed upwardly, and another indicated at 5 and disposed downwardly. An upstanding member 6 is fixed to the intermediate portion of the base bar 1 adjacent the curved portions 4, so that said curved portions 4 and 5 are located between the upstanding portion 6, and the upstanding extension 3, as is clearly seen in Figure 2. A pair of U-shaped main trap jaws 7 and 8 are provided with outwardly projected pintles 9 at their ends which are journaled in the upstanding member 6, and the upstanding extension 3. A slide member 10 is provided with an opening 11 for receiving the extension 3, and portions of the jaws 7 and 8. The inner end of this slide member is bifurcated as at 12, and the extremities of the bifurcations receive a pin 13 about which is coiled a pair of springs 14. The inner ends of these springs extend through the juncture of the curved portion 5 with the intermediate portion of the bar 1 and engage the under surface of the bar 1 as is indicated to advantage at 15 in Figure 2. The other or outer ends of these springs are engaged in the bifurcations 12, as is indicated to advantage at 16 in Figure 1, so that the slide member normally is swung upwardly so as to close the main trap jaws 7 and 8 toward each other for engaging an animal in the well known manner. In order to hold the trap jaws in an open or set position, I provide a trip and trigger mechanism which is mounted on a cross base member 17 extending under the intermediate portion of the bar 1 between the curved portions 4 and 5, and fixed thereto in any suitable manner such as is indicated at 18. An anchor chain 19 is attached to one end of this cross base member 17. A trigger 20 is pivoted on the other end of the base member 17. A treadle 21 is pivoted on the base member 17 and is provided with a catch 22 for receiving the free end of the trigger 20 so as to hold the same over one of the jaws, in the present instance the main jaw 7, thereby holding the slide member 10 down so that the two jaws 7 and 8 may remain in a set or open position.

An auxiliary stationary jaw 25 has a portion thereof extended through the loop 2, and a straight portion disposed in the curved portion 4. This straight portion has a pair of coiled springs 26 disposed thereabout, the inner ends thereof being anchored by engagement with the cross base member 17 while the outer ends thereof are engaged with a U-shaped auxiliary jaw 27 which has its terminals provided with eyes 28 for receiving the straight portion of the stationary jaw so as to be pivoted in relation thereto.

The springs 26 are normally tensioned to hold the auxiliary jaw 27 over upon the stationary auxiliary jaw 25. When the trap is set however, the movable auxiliary jaw 27 is disposed under the slide member as is clearly indicated in Figures 1 and 2. It will therefore be seen that when an animal steps upon the treadle 21, thereby releasing the trigger 20 that the slide member will swing upwardly and will be aided in its upwardly swinging movement by the springs 26 through the intermediacy of the auxiliary jaw 27, and thereby hasten the closing of the main jaws 7 and 8 to insure the trapping of the animal before the auxiliary movable jaw 27 engages said animal.

By this invention the main trap is vastly improved because of the increased efficiency afforded by the active association of the auxiliary trap jaw therewith, said auxiliary trap jaw either killing the animal or holding it so that there is no possibility of escape. The movement of the pivotally mounted auxiliary jaw is absolutely predetermined, and controlled by the jaw closing means of the main trap features.

It is thought that the construction, operation, and advantages of this invention will now be clearly appreciated and understood by those skilled in this art. It is desired, however, to point out that the present embodiment of the invention has been disclosed merely by way of example, and in practice attains the features of advantage enumerated as desirable in the statement of the invention, and the above description.

It is apparent that numerous details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:

1. An animal trap having in combination, a pair of pivotally mounted main jaws, a pivotally mounted auxiliary jaw having its axis of movement at an angle to the axis of the main jaws, a spring operated member for closing the main jaws, and adapted to receive thereunder a portion of the auxiliary jaw, means for normally closing the auxiliary jaw so that said auxiliary jaw aids in the operation of said member to close the main jaws, and a trip and trigger mechanism for holding the member in an inactive position with the jaws set or open.

2. In a trap, the combination with a base, of a pair of co-acting jaws, means tending when unrestrained to swing said jaws toward each other, a swingable tensioned member adapted to engage said means to position the same clear of said jaws, and a treadle for impositively locking said means in position clear of said jaws.

3. In a trap, the combination with a base, of a pair of co-acting jaws, means tending when unrestrained to swing said jaws toward each other, a swingable tensioned member adapted to engage said means to position the same clear of said jaws, and a treadle for impositively locking said means in position clear of said jaws, said means until released by said treadle holding the said swingable member from swinging.

4. In a trap, the combination with a base, of a pair of co-acting jaws, means tending when unrestrained to swing said jaws toward each other, a swingable tensioned member adapted to position said means clear of said jaws, and a treadle for impositively locking said means in position clear of said jaws, said member being a bail and the said means being a lever positioned between the side arms of the bail, the lever until released by said treadle holding the bail from swinging.

In testimony whereof I affix my signature.

LOUIS G. GOODKNECHT.